Figure 20:
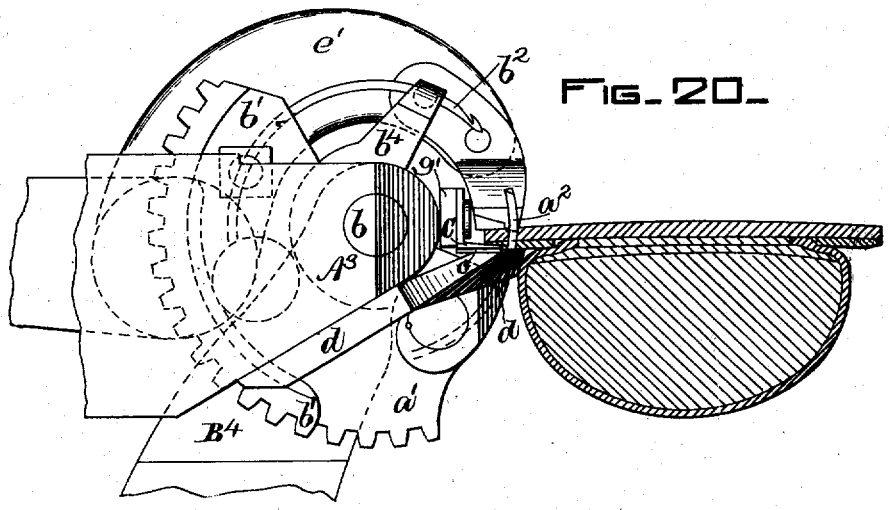

J. B. HADAWAY.
WELT BEVELING ATTACHMENT FOR SOLE SEWING MACHINES.
No. 11,578. Reissued Dec. 8, 1896.
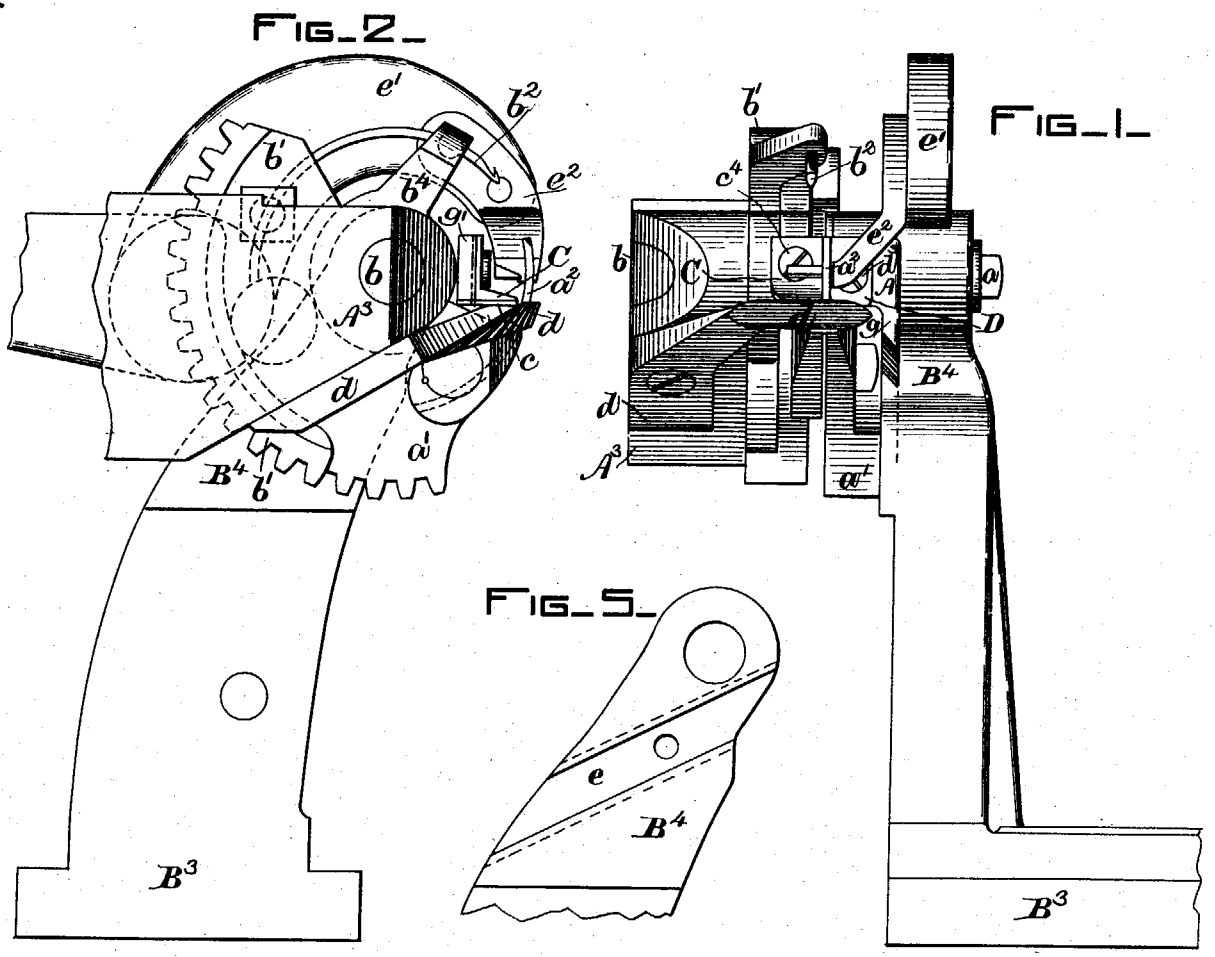
WITNESSES
A. G. Clifford
A. E. Hayes.
INVENTOR
John B. Hadaway.
By his attorneys
Phillips & Anderson J. B. HADAWAY.
WELT BEVELING ATTACHMENT FOR SOLE SEWING MACHINES.
No. 11,578. Reissued Dec. 8, 1896.
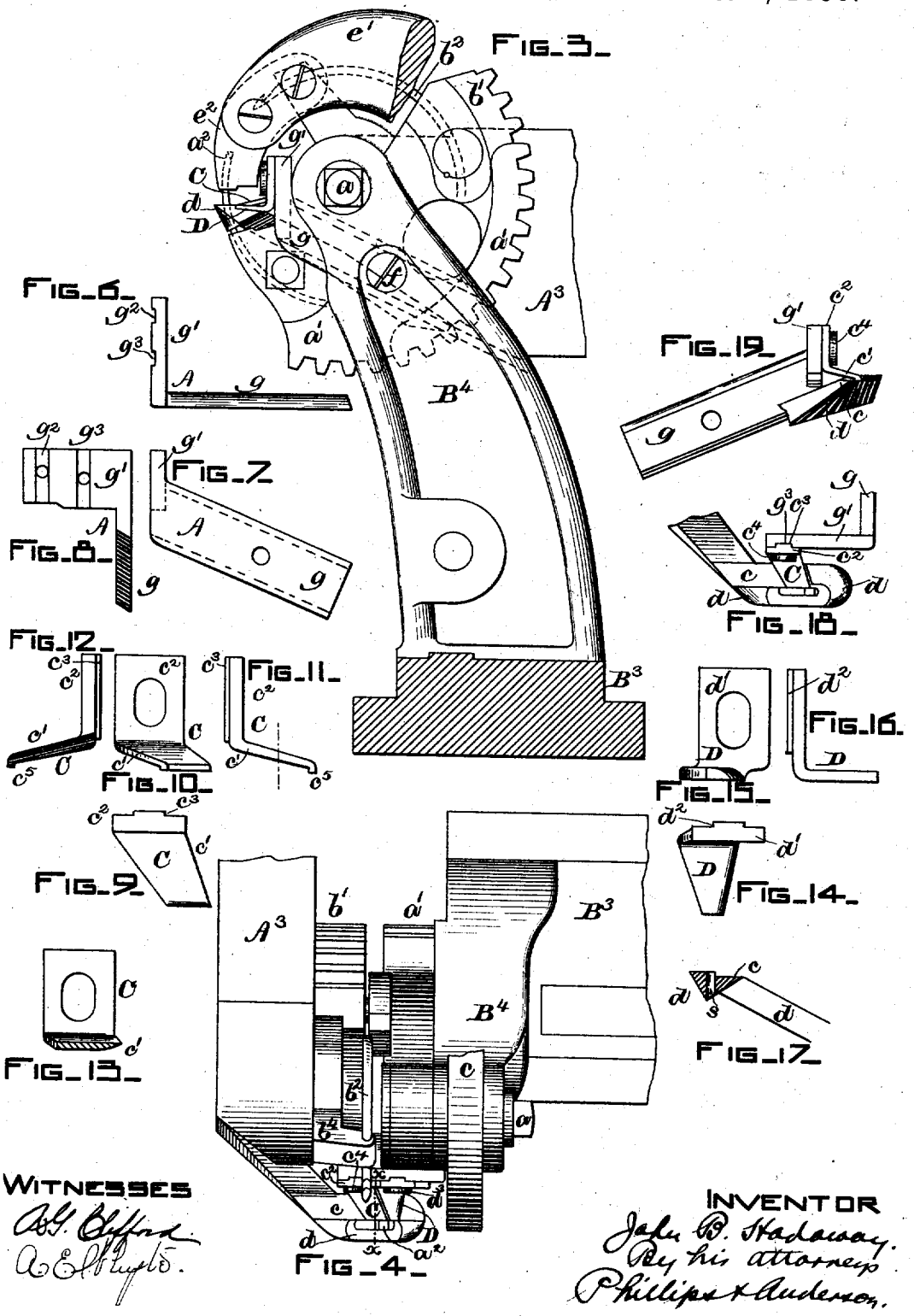
WITNESSES
A. G. Clifford
A. E. Phillips.
INVENTOR
John B. Hadaway.
By his attorneys
Phillips & Anderson.

3 Sheets—Sheet 3.

J. B. HADAWAY.

WELT BEVELING ATTACHMENT FOR SOLE SEWING MACHINES.

No. 11,578. Reissued Dec. 8, 1896.

WITNESSES

A. G. Clifford.

A. E. Phillips.

INVENTOR

John B. Hadaway,

By his attorneys

Phillips & Anderson

UNITED STATES PATENT OFFICE.

JOHN B. HADAWAY, OF BROCKTON, MASSACHUSETTS.

WELT-BEVELING ATTACHMENT FOR SOLE-SEWING MACHINES.

SPECIFICATION forming part of Reissued Letters Patent No. 11,578, dated December 8, 1896.

Original No. 549,124, dated November 5, 1895. Application for reissue filed July 17, 1896. Serial No. 599,327.

*To all whom it may concern:*

Be it known that I, JOHN B. HADAWAY, a citizen of the United States, residing at Brockton, in the county of Plymouth and State of Massachusetts, have invented a new and useful Improvement in Welt-Beveling Attachments for Sole-Sewing Machines, of which the following, taken in connection with the accompanying drawings, is a specification.

My invention relates to a welt-beveling attachment for sole-sewing machines; and it consists in certain novel features of construction, arrangement, and combination of parts, which will be best understood by reference to the description of the accompanying drawings and to the claims hereto appended and in which my invention is clearly pointed out.

I have illustrated my invention as applied to the Goodyear sole-sewing machine shown and described in the Letters Patent No. 473,870, issued to the Goodyear Shoe Machinery Company as the assignees of Z. T. French and William C. Meyer, dated April 26, 1892, to which patent reference may be had for any information relating to parts of the sewing-machine not shown in the accompanying drawings, in which—

Figure 1 is a front elevation of so much of the sewing-machine as is necessary to illustrate the application of my invention thereto. Fig. 2 is a side elevation of the same parts looking toward the right of Fig. 1. Fig. 3 is an elevation of the same parts looking in the opposite direction. Fig. 4 is a plan of the same with the presser-foot removed. Fig. 5 is an inside elevation of the upper portion of the awl-segment-carrying stand as modified to receive my welt-beveling attachment. Fig. 6, 7, and 8 are respectively a plan, a side elevation, and an end elevation of the cutter-carrying stock. Figs. 9, 10, 11, 12, and 13 are respectively a plan, a front elevation, a left-side elevation, a right-side elevation, and a sectional front elevation of the cutter drawn to an enlarged scale. Figs. 14, 15, and 16 are respectively a plan, a front elevation, and a left-side elevation of the knife-guard drawn to an enlarged scale. Fig. 17 is a transverse section of the work support or table on line X X on Fig. 4, and Figs. 18 and 19 are respectively a plan and a side elevation of a modified form of the work-support and the cutter-carrying stock. Fig. 20 is an elevation of a portion of the sewing-machine with invention applied thereto and showing a section of a shoe in position for being operated upon.

In the drawings, $A^3$ represents a small portion of the fixed frame of the head of the machine, in which is set the stud $b$, upon which is mounted loosely the needle-carrying segment $b'$, to which is secured the curved hooked needle $b^2$ in the same manner as shown and described in the patent before cited.

$B^3$ is a slide fitted to a suitable guideway, (not shown,) so as to be movable horizontally to feed the work, and provided at its inner end with the upright or arm $B^4$, having set in its upper end the fixed stud $a$, upon which is mounted loosely the awl-segment $a'$, to which is secured the curved awl $a^2$, and $d$ is the work-support secured to the frame $A^3$ in a fixed position and is provided with a slot for the passage of the awl and needle.

The parts so far described are constructed and operate substantially as shown and described in the Letters Patent before cited, except that the work-support $d$ has a portion of its upper bearing-surface cut away to form the rabbet $c$, which may extend the whole length of the table portion of said support, as shown in Fig. 4, or a portion only of said length, as shown in Fig. 18, and also except that the stand $B^4$ has an inclined dovetailed groove $e$, formed in its inner face to receive the cutter-stock A, which is firmly secured therein by the clamping-bolt $f$.

The cutter-stock A has the dovetailed shank $g$ to fit the dovetailed groove $e$ in the stand $B^4$ and the vertical plate or flange $g'$, in the front face of which are formed two vertical grooves $g^2$ $g^3$ to register the cutter and cutter-guard.

C is the cutter, having a cutting edge $c'$, slightly inclined to a horizontal plane and arranged oblique to the line of feed of the work, as shown in Figs. 4 and 18. The cutter C is also provided with the flange $c^2$, having on its back side the rib $c^3$ to fit the groove $g^3$ in the stock A, where it is secured by the clamping-screw $c^4$, as shown in Figs. 1, 2, 3, and 4.

D is the knife-guard, provided with the flange $d'$ and the rib $d^2$ to fit the groove $g^3$ and secured to the stock A by the clamping-screw $d^3$, the holes through the flanges $c^2$ and $d'$ being elongated, so that said knife and guard may be adjusted vertically to adapt the machine to work of different thickness.

In the patent hereinbefore cited the presser-foot lever $e'$ was mounted upon a stud set in a boss on the stand $B^4$ and moved laterally with the said stand; but in the Goodyear machine as now constructed said lever is mounted upon a stud set in some fixed portion of the frame of the machine and has only an up-and-down movement and clamps the work firmly when the stand $B^4$, the awl-segment, and the awl are being moved backward after having fed the work preparatory to puncturing the work for a new stitch and feeding it another step. This presser-foot lever $e'$, as modified in the machines as now built, is shown in Fig. 2, and has secured thereto the presser-foot $e^2$, which is constructed and operates substantially as in the patent cited, except that it has no lateral movement and is arranged to clamp the work firmly while the needle is in the work and the feed mechanism is being retracted, as above described.

The operation of my invention is as follows: With the several parts of the machine in the positions indicated in the drawings the presser-foot has been unlocked preparatory to feeding the work. The first movement is the feeding of the work a distance equal to the desired length of stitch, thereby carrying the knife C toward the left of Figs. 1 and 4 a corresponding distance without changing the position of its cutting edge relative to the end of the cut last made thereby. When the feeding is completed, the presser-foot is depressed upon the work and locked in position. The awl is then withdrawn, during which time the needle enters the work preparatory to the formation of a stitch. The motion of the feed-slide is then reversed, and the awl and its segment are returned to their original positions, carrying with them the cutter C, the cutting edge of which severs a section of a beveled shaving from the welt of a length substantially corresponding to or slightly greater than the length of the stitch being sewed. It will be noted in this connection that along the substantially straight portions of the seam the length of the cut is substantially equal to the length of the stitch, but that at the curved portions, for example, the toe, it must be slightly greater in order to completely sever the shaving from the welt. The cutter C has formed on its front end the depending lip $c^5$, having a vertical cutting edge, which serves the purpose of insuring the complete severance of the skived shaving, even if the knife should be adjusted to a higher level than is desirable. By virtue of the cutting edge of the knife C being oblique to the line of feed of the work with the end next the line of stitches in advance when operating to cut the shaving from the welt said knife acts with a drawing cut and serves to draw the work upon the work-support instead of tending to crowd it off the work-support.

In Figs. 18 and 19 a modification is illustrated, in which the knife-guard D, movable with the cutter C, is dispensed with by cutting the rabbet $c$ in the rear portion of the upper face of the work-support only to a point near the right-hand end of the slot $s$, through which the needle and awl pass in piercing the work, the remaining unrabbeted portion of the upper surface of the work-support serving as a fixed guard to gage the thickness of the shaving to be cut from the welt.

In Letters Patent of the United States No. 549,125, issued to me upon an application filed the 24th day of June, 1895, I have illustrated, described, and claimed a modified form of a welt-beveling attachment for sole-sewing machines in which the cutter is stationary and the beveling is done by feeding the work against the cutting edge of said cutter.

What I claim as new, and desire to secure by Letters Patent of the United States, is—

1. In combination with the stitch-forming mechanism of a sewing-machine, a work-support; mechanism for feeding the work; a knife located just in the rear of the needle and awl slot in said work-support and movable with said feed mechanism and adapted to cut a section of a beveled shaving from the upper surface of the welt at each retraction of said feed mechanism.

2. In combination with the stitch-forming mechanism of a sewing-machine, a work-support; mechanism for feeding the work; a knife located just in the rear of the slot in said work-support and having its cutting edge slightly inclined to a horizontal plane and movable with said feed mechanism; and adapted to cut a section of a beveled shaving from the upper surface of the welt at each retraction of the feed mechanism.

3. In combination with the stitch-forming mechanism of a sewing-machine, a work-support; mechanism for feeding the work; a knife located just at the rear of the slot in the work-support, and having its cutting edge slightly inclined to a horizontal plane and oblique to the line of feed of the work and movable with said feed mechanism, and adapted to cut a section of a beveled shaving from the upper surface of the welt at each retraction of the feed mechanism.

4. In combination with the stitch-forming mechanism of a sewing-machine, a work-support having the rear or inner portion of its upper surface rabbeted or cut away as described; mechanism for feeding the work; a knife carried by said feed mechanism and movable in said rabbet or cut-away space, whereby a section of a beveled shaving is cut at each retraction of the feed mechanism.

5. In combination with the stitch-forming mechanism of a sewing-machine, a work-support having the rear or inner portion of its upper surface rabbeted or cut away, as described; mechanism for feeding the work; a knife carried by said feed mechanism and movable therewith, and located above said rabbet with its front end adjacent to the slot in said support, for the passage of the needle, and having a portion of its cutting edge at its front end turned downward from its main body as described.

6. In combination with the stitch-forming mechanism of a sole-sewing machine, a work-support having the rear or inner portion of its upper surface rabbeted or cut away as described; mechanism for feeding the work; a cutter carried by said feed mechanism and movable therewith, and adapted to cut a section of a beveled shaving from the upper surface of the welt at each retraction of said feed mechanism; and a guard or gage to determine the thickness of said shaving.

7. The combination with the stitch-forming mechanism of a shoe-sewing machine, of mechanism for feeding the work, and welt-beveling mechanism arranged to bevel the welt during the sewing operation, substantially as described.

8. The combination with the stitch-forming mechanism of a shoe-sewing machine, of mechanism for feeding the work, a movable cutter arranged to bevel the welt during the sewing operation, and means for actuating said cutter, substantially as described.

9. In a welt-beveling attachment for shoe-sewing machines a welt-beveling knife having a portion of the cutting edge at its front end turned downward from its main body, and means for adjusting said knife to regulate the depth of cut, substantially as described.

10. The combination with the stitch-forming mechanism of a shoe-sewing machine, of mechanism for feeding the work, welt-beveling mechanism for beveling the welt, and means for operating the welt-beveling mechanism while the work is held by the stitch-forming mechanism, substantially as described.

11. The combination with the stitch-forming mechanism of a shoe-sewing machine, of mechanism for feeding the work, a cutter arranged to bevel the welt and means for adjusting the cutter to determine the thickness of the shaving cut from the welt, substantially as described.

In testimony whereof I have hereunto set my hand, in the presence of two attesting witnesses, this 9th day of July, 1896.

JOHN B. HADAWAY.

Witnesses:

A. E. WHYTE,

A. G. CLIFFORD.